(12) United States Patent
Freidberg et al.

(10) Patent No.: US 12,033,763 B2
(45) Date of Patent: Jul. 9, 2024

(54) LIQUID SANDWICH VACUUM VESSEL FOR MAGNETIC FUSION

(71) Applicant: Massachusetts Institute of Technology, Cambridge, MA (US)

(72) Inventors: Jeffrey Freidberg, Belmont, MA (US); Sara Ferry, Chelsea, MA (US); Dennis G. Whyte, Brookline, MA (US); Caroline Sorensen, Belmont, MA (US); Ethan Peterson, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 17/190,755

(22) Filed: Mar. 3, 2021

(65) Prior Publication Data

US 2021/0280327 A1    Sep. 9, 2021

Related U.S. Application Data

(60) Provisional application No. 62/985,578, filed on Mar. 5, 2020.

(51) Int. Cl.
*G21B 1/17* (2006.01)
*G21B 1/13* (2006.01)
*G21B 1/05* (2006.01)

(52) U.S. Cl.
CPC ............... *G21B 1/17* (2013.01); *G21B 1/13* (2013.01); *G21B 1/057* (2013.01)

(58) Field of Classification Search
CPC . G21B 1/17; G21B 1/12; G21B 1/057; H05H 1/12

See application file for complete search history.

(56) References Cited

U.S. PATENT DOCUMENTS 3,762,992 A * 10/1973 Hedstrom ................ G21B 1/03
                                                          976/DIG. 3
4,145,250 A *  3/1979 Ohkawa ................... G21B 1/25
                                                          427/580

(Continued)

OTHER PUBLICATIONS

Sorbom, B. N., et al. "ARC: A compact, high-field, fusion nuclear science facility and demonstration power plant with demountable magnets." Fusion Engineering and Design 100 (2015): 378-405. (Year: 2015).*

(Continued)

*Primary Examiner* — Sharon M Davis
(74) *Attorney, Agent, or Firm* — Daly, Crowley, Mofford & Durkee, LLP

(57) ABSTRACT

A "liquid sandwich" vacuum vessel for magnetic confinement fusion of plasma includes two rigid structural "bread" members that form a double-walled vessel and a non-structural "cheese" material disposed between the walls. The inner member is semi-conductive and encloses a volume of fusing plasma, while the outer member may contact a neutron shield (e.g. a molten salt blanket) and is corrosion-resistant. The non-structural material is solid at room temperature, but is molten during fusion, and is preferably lead. The structural members may be steel or silicon carbide, or similar structural material. During a disruption of fusion, excess electrical energy that escapes from the plasma into the vessel will primarily shear the liquid material rather than the structural members, allowing the "bread" to be thin.

20 Claims, 4 Drawing Sheets

(56) References Cited

U.S. PATENT DOCUMENTS

| | | | | |
|---|---|---|---|---|
| 4,292,126 | A | * | 9/1981 | Ohkawa ................ G21B 1/057 |
| | | | | 376/125 |
| 4,344,911 | A | * | 8/1982 | Maniscalco ............ G21B 1/03 |
| | | | | 376/904 |
| 4,663,110 | A | * | 5/1987 | Cheng ................... G21C 1/022 |
| | | | | 976/DIG. 12 |
| 4,696,781 | A | | 9/1987 | Bourque |
| 6,411,666 | B1 | | 6/2002 | Woolley |
| 2012/0250812 | A1 | | 10/2012 | Weaver |
| 2018/0047462 | A1 | * | 2/2018 | McGuire ................ H05H 1/14 |

OTHER PUBLICATIONS

PCT International Search Report and Written Opinion dated May 20, 2021 for International Application No. PCT/US2021/020575; 10 pages.

Suri, et al., "Materials issues in fusion reactors," Journal of Physics, May 2, 2021; 17 Pages.

* cited by examiner

LIQUID SANDWICH VACUUM VESSEL FOR MAGNETIC FUSION

CROSS REFERENCE TO RELATED APPLICATIONS

This application claims the benefit of U.S. Provisional Application 62/985,578, filed Mar. 5, 2020, the entire contents of which are incorporated by reference herein.

FIELD

This disclosure relates generally to thermonuclear fusion reactors, and more particularly to vacuum chambers for tokamak fusion reactors.

BACKGROUND

As is known in the art, a tokamak is a device that uses powerful magnetic fields to confine hot plasma in a relatively small volume, thereby triggering thermonuclear fusion and the release of large amounts of energy. In various tokamaks, the operating plasma may at times reach temperatures of 100 million degrees K or even higher. Such hot plasma should not escape into the environment, and the efficiency of the nuclear reaction is decreased by the presence of unwanted matter from the environment, so the plasma is confined in an otherwise evacuated chamber known as the vacuum vessel ("VV").

In this connection, FIG. 1 shows a three-dimensional graphic of a fusion power plant 100 (i.e. a tokamak) with a cutaway portion illustrating relevant components. The fusion power plant 100 includes a core region 110 for containing the plasma, and the cross section of the core region 110 is approximately the shape of the plasma during power production. The core region 110 is surrounded by a neutron shield 120, which also acts as a heat sink and may be provided as a blanket of molten salt (e.g. FLiBe, a mixture of lithium fluoride and beryllium fluoride). The fusion power plant 100 also includes a magnet coil 130 that is used with other such coils to magnetically trap the ionic plasma in a small volume within the core region 110. Separating the plasma in the core region 110 from the neutron shield 120 is the vacuum vessel 140, which physically traps the plasma. The fusion power plant 100 has other parts that are not described herein, but are known in the art.

In FIG. 2 is shown a simplified diagram of a vacuum vessel system 200 that illustrates various challenges in designing vacuum vessels for a fusion power plant such as that shown in FIG. 1. The system 200 is simplified to represent only the heated plasma 210, a solid vacuum vessel 220, and the neutron shield 230 (i.e. the molten salt blanket). There are two relevant quantities to be considered: thermal energy and electrical energy.

Thermal energy is produced by the plasma 210 in two forms. The first form, accounting for about 20% of the total, is direct heating of the interior surface of the vacuum vessel 220 by the hot plasma 210. The second form, accounting for about 80% of the total, is volumetric heating due to neutrons which penetrate through the vacuum vessel 220 into the neutron shield 230 a distance of approximately 20 cm to 50 cm. Kinetic energy from these neutrons is captured by the neutron shield 230 as heat, which is conveyed to electric generators (not shown) for the production of useful power, as known in the art. Meanwhile, the surface heating plus volumetric heating results in a temperature gradient ($\nabla$T) to exhaust heat.

Electrical energy is contained within the plasma 210 due to the fact that the plasma 210 comprises moving ions having an electrical charge. The plasma 210 is a highly variable electrical conductor, and may hold millions of amperes, or MA, of electric current. During ordinary operation of a tokamak, the magnetic field is ramped up and down gradually, allowing the plasma current to increase and decrease slowly. Occasionally, however, the electric current may be suddenly disrupted over the span of about 1 to 100 milliseconds (e.g. due to a loss of magnet superconductivity), and the current in the plasma 210 flows to the nearest electrical conductor—the vacuum vessel 220. As the molten salt of the neutron shield 230 is typically a poor electrical conductor, the bulk of the dumped current remains in the vacuum vessel 230. This event results in very large Lorentz (I×B) forces on the vacuum vessel 220, which can cause structural damage and even ruin the vacuum vessel 220.

For the above reasons, vacuum vessels have been made from structural solids that are good thermal conductors and electrical semi-conductors, and that resist corrosion due to direct contact with molten salt (e.g. stainless steel). However, the above considerations present a fundamental challenge to vacuum vessel design. For a solid vacuum vessel having a fixed thermal conductivity characteristic, it is desirable to make the vessel as thin as possible to improve heat removal. But the vessel also must be able to withstand large forces due to sudden plasma current disruption, so it is also desirable to make the vacuum vessel as thick as possible to ensure the required structural integrity.

SUMMARY

In view of the above tension between heat removal and structural stability, described herein are embodiments of structures and techniques for a "liquid sandwich" vacuum vessel (VV). In one aspect of the concepts described herein, a vacuum vessel comprises two thin structural members (such as steels or silicon carbide) forming a double-walled shell or "bread", and a non-structural "cheese" (e.g. lead) disposed between the walls of the "bread" that is solid at room temperature but is liquid during high-temperature operation. The "cheese" is fully captured in the closed volume of the "bread" shell. The "bread" members provide structural support and high thermal conductivity, while the "cheese" convectively transfers heat between the structural members. Moreover, the "cheese" absorbs the strong shear forces that occur during a disruption, which do not cause deformation of the structural "bread" By separating the thermal and electrical design functions, a broader range of vacuum vessel designs and materials is enabled.

Thus, one embodiment is a vessel for containing a plasma within a volume. The vessel includes a rigid, inner structural member enclosing the volume. The vessel also includes a rigid, outer structural member enclosing, and rigidly coupled to, the inner structural member. The vessel further includes a non-structural material disposed in a space between the inner and outer structural members, the non-structural material being solid at room temperature and being molten when the vessel is heated by thermonuclear fusion of the plasma.

In some embodiments, the non-structural material comprises a metal. The metal may be lead, for example. In some embodiments, the non-structural material is a neutron multiplier.

In some embodiments, the inner structural member is a semi-conductor.

In some embodiments, the inner structural member, or the outer structural member, or both members comprise atoms having atomic numbers that are lower than an atomic number of atoms comprising the non-structural material.

In some embodiments, the outer structural member resists corrosion by a molten fluoride salt. In some embodiments, the non-structural material has a melting point that is lower than a melting point of the fluoride salt.

In some embodiments, the inner and outer structural members include a steel or silicon carbide, And in some embodiments, the inner and outer structural members have a combined thickness that is less than a thickness of the non-structural material.

It is appreciated that the concepts, techniques, and structures disclosed herein may be embodied in ways other than those described above, and that the embodiments listed in this Summary are illustrative, not comprehensive.

BRIEF DESCRIPTION OF THE DRAWINGS

The concepts, techniques, and structures sought to be protected herein may be more fully understood from the following detailed description of the drawings. It should be noted that the drawings are not necessarily to scale, but instead are drawn to emphasize the concepts, techniques, and structures sought to be protected.

It should be noted that the drawings are not necessarily to scale, or inclusive of all elements of a system, emphasis instead generally being placed upon illustrating the concepts, structures, and techniques sought to be protected herein.

DETAILED DESCRIPTION

Described are structures and techniques for a vacuum vessel ("VV") having a "liquid sandwich" configuration. Such a VV may be appropriate for use in a fusion reactor such as a tokamak fusion reactor or ARC reactor.

Figure 1:
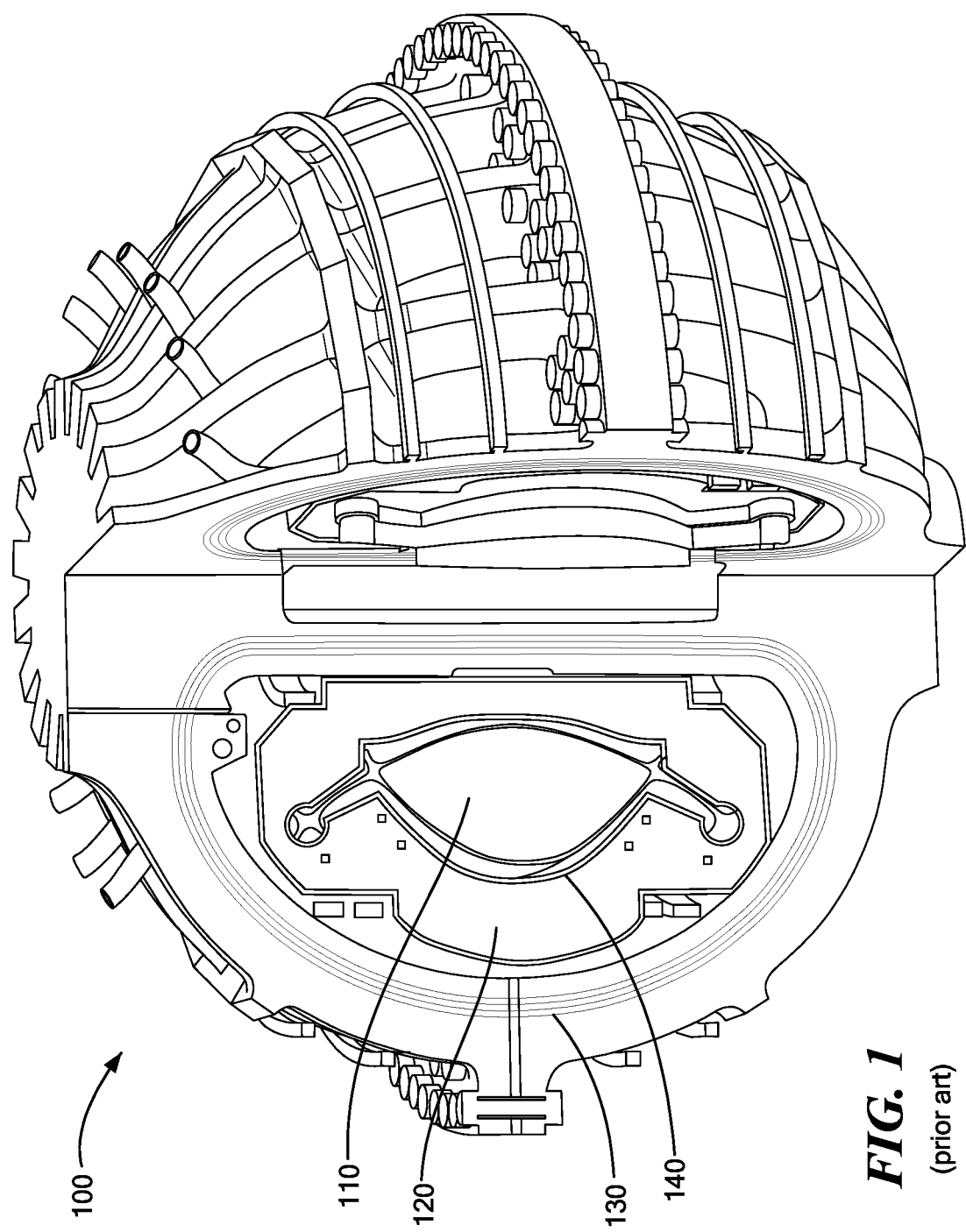
FIG. 1 is a three-dimensional graphic of a prior art fusion power plant with a cutaway portion illustrating various components according to an embodiment.
Figure 2:
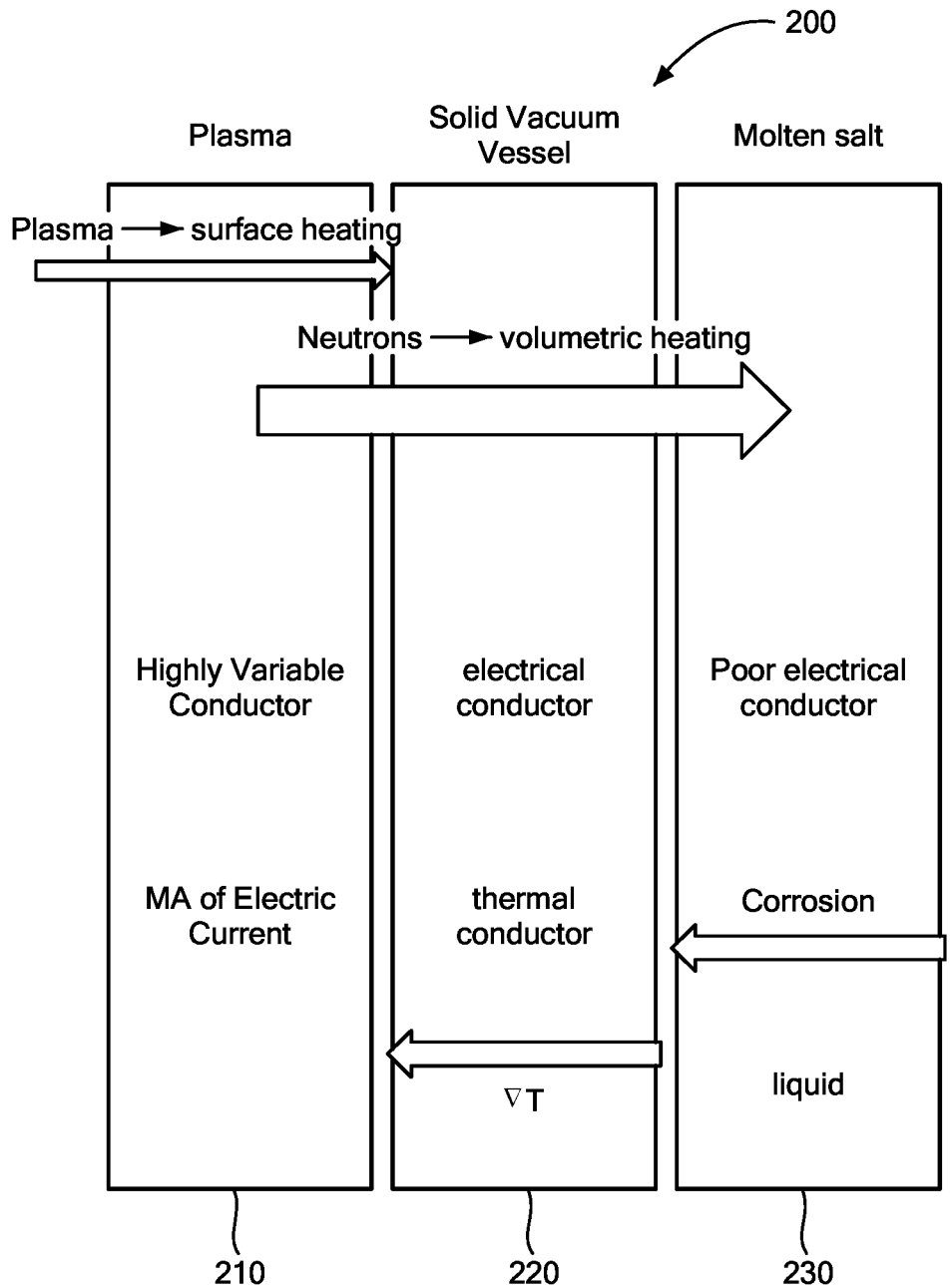
FIG. 2 is a diagram of a prior art vacuum vessel system.
Figure 3:
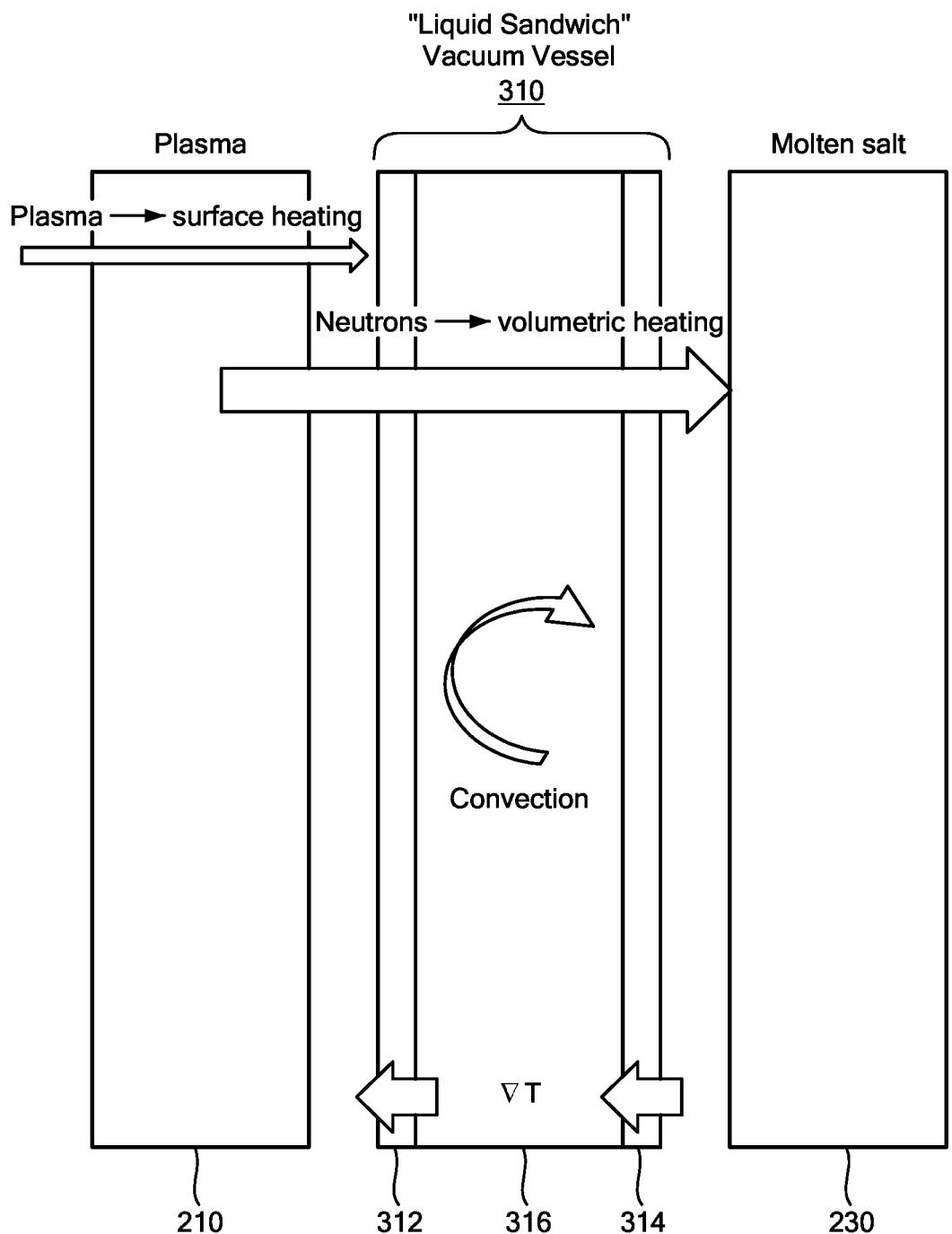
FIG. 3 is a diagram of a liquid sandwich vacuum vessel (VV) according to an embodiment of the concepts, techniques, and structures disclosed herein.

Referring now to FIG. 3, in one aspect of the concepts, techniques, and structures described herein, a "liquid sandwich" vacuum vessel 310 is designed for containing a plasma 210 for magnetic confinement fusion within a volume that is otherwise evacuated. The vacuum vessel 310 comprises a rigid, inner structural member 312 enclosing the volume in which the plasma is confined. The inner structural member 312 may comprise a semi-conductor, such as a steel or silicon carbide (SiC), to allow it to accept electrical discharges from the plasma. Advantageously, SiC has a tunable electrical conductivity and high thermal conductivity.

The vacuum vessel 310 also includes a rigid, outer structural member 314 enclosing, and rigidly coupled to, the inner structural member 312, to form a double wall. The outer structural member 314 may be made of the same, or different material than the inner structural member 312, i.e. steel or SiC. The rigid coupling between the two "bread" members 312, 314 is not shown in FIG. 3, but may take any form known in the art of double-walled vessels that provides sufficient rigid support, and may comprise the same material as either member 312, 314. In embodiments, the outer structural member 314 may be placed into direct contact with, and therefore should resist corrosion by, a molten fluoride salt 230 such as FLiBe that is used as a neutron absorber.

The vacuum vessel 310 further includes a non-structural "cheese" material 316 disposed between the inner structural member 312 and the outer structural member 314. This cheese material 316 is fully captured in the closed volume of the double-walled shell, and is solid at room temperature but molten when the vessel 310 is heated by thermonuclear fusion of the plasma. In some embodiments, the members 312, 314 are as thin as possible to provide structural support, without plastic deformation, for the forces that the material 316 experiences both during normal operation and during a disruption in the field. Thus, the inner and outer structural members 312, 314 may have a combined thickness that is less than the thickness of the cheese material 316.

Figure 4:
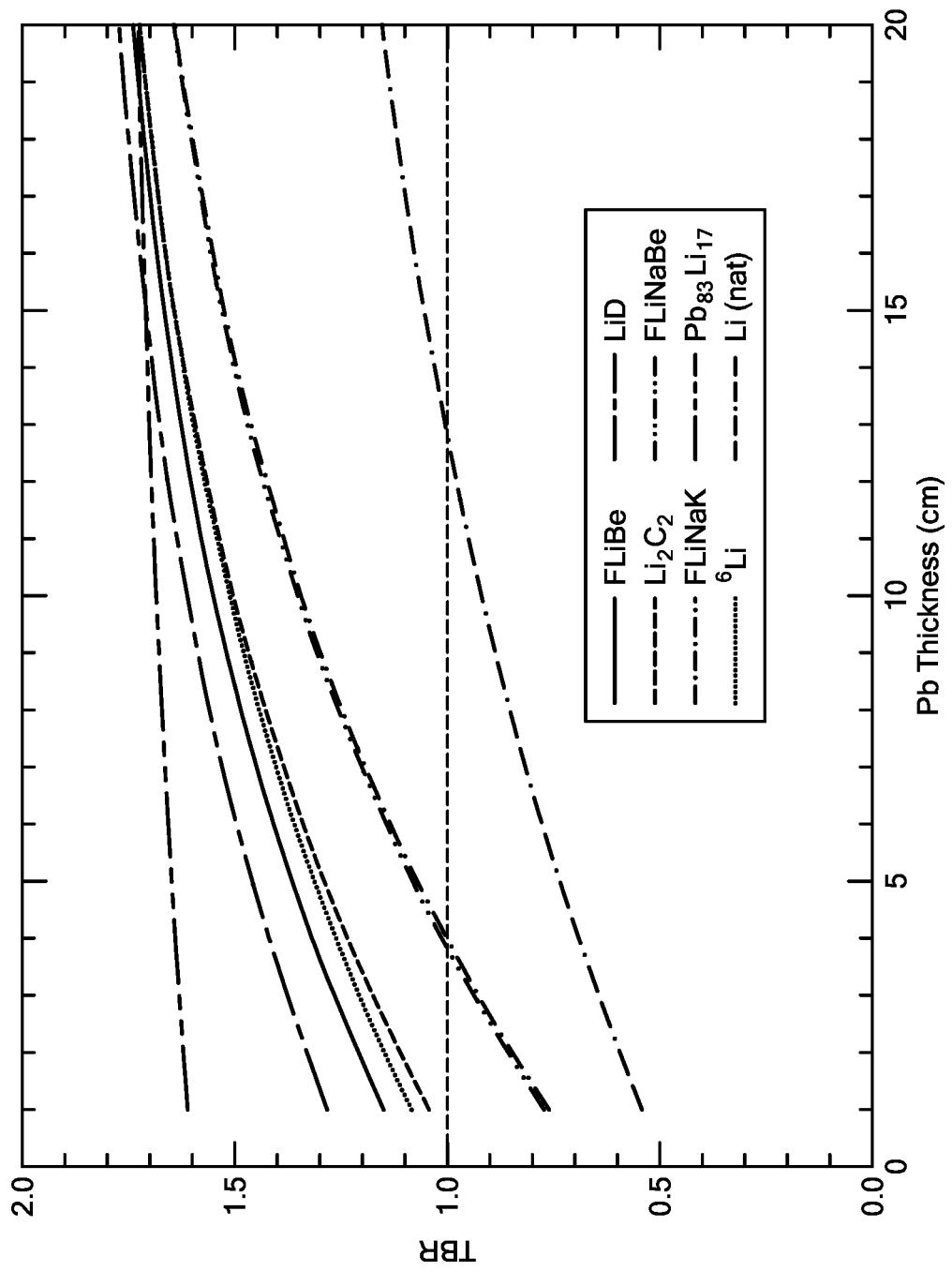
FIG. 4 is a plot of tritium breeding ratio (TBR) vs. lead (Pb) thickness.

In various embodiments, the cheese material 316 is a metal, especially lead. The use of lead as the cheese material 316 has a number of advantages. In one aspect, lead is a relatively inexpensive material. In another aspect, the cheese material 316 may have a relatively low neutron activation while being a neutron multiplier, like lead. The primary source of heat useful for power generation is neutron radiation into the molten salt 230, so more heat is generated by increasing the neutron flux using a neutron multiplier as the cheese material 316. Also, excess neutrons may interact with the lithium atoms in the molten salt 230 to breed tritium, which can be extracted and used as a fuel source to supplement the fusing plasma 210. In this connection, FIG. 4 is a plot of the computed tritium breeding ratio (TBR) versus thickness of a lead cheese material 316 in embodiments using various molten lithium compounds 230.

In another aspect, the cheese material 316 should have a lower melting point than the molten salt 314 so that it melts before the salt as the reactor is brought up to operating temperature. As is known in the art, lead has a lower melting point than FLiBe and various other lithium-bearing salts.

The cheese material 316 also should be an electrical conductor, like lead. In embodiments, the electric fields induced during a disruption will drive current primarily in the liquid cheese material 316, rather than in the structural members 312, 314. These fields may be tailored by adjusting the geometry or conductivity of the members 312, 314. The I×B forces therefore will primarily shear the liquid lead 316 rather than the structural members 312, 314, and this shearing energy will be dissipated through ohmic heating with minimal damage to the actual vacuum interface, i.e. the inner structural member 312. Thus, the structural members 312, 314 may have a much lower electrical conductivity than the cheese material 316, allowing a broad range of materials to be used as structural members 312, 314.

In embodiments, heat convection through the vessel 310 is promoted by exploiting magnetohydrodynamic (MHD) effects of the Lorentz (I× B) force in the cheese material 316 during steady-state operation. Thus, normal heating of the cheese material 316 induces convective heat transfer between the structural walls, as indicated in FIG. 3, which may be on the order of millimeters per second, facilitating efficient heat transfer. MHD effects also are useful during disruptions. Unlike fully solid prior art vacuum vessels, no structural deformities occur in disclosed embodiments because only the liquid cheese material 316 is strongly sheared.

Moreover, to ensure that electrons with high energy (e.g. 20-50 MeV) emitted during a disruption do not damage the structural members 312, 314, the structural members 312, 314 may be made of atoms having atomic numbers that are lower than those of the cheese material 314. Thus, in one embodiment, the "bread" members 312, 314 are made of silicon carbide (atomic numbers 14 and 6) while the "cheese" material 316 is made of lead (atomic number 82).

In this way, the thermal function of the interface between the plasma 210 and the inner structural member 312 is separated from the function of dissipating transient disruptive forces. This design therefore mitigates worst-case failure modes, leading to higher capacity factor, and more robust operation. In particular, molten lead does not have any crystalline displacements-per-atom (DPA) limits because it is already a liquid, so the thin structural members 312, 314 of embodiments exhibit less overall volumetric degradation in the presence of radiation than the solid vacuum vessels known in the art.

In one aspect, this approach enables design choice freedom which leads to a less expensive, more efficient reactor (for example, due to enabling a higher operating temperature). Moreover, it may be possible to totally eliminate beryllium from reactor design.

Various embodiments of the concepts systems and techniques are described herein with reference to the related drawings. Alternative embodiments can be devised without departing from the scope of the described concepts. It is noted that various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. As an example of an indirect positional relationship, references in the present description to element or structure "A" over element or structure "B" include situations in which one or more intermediate elements or structures (e.g., element "C") is between element "A" and element "B" regardless of whether the characteristics and functionalities of element "A" and element "B" are substantially changed by the intermediate element(s).

The following definitions and abbreviations are to be used for the interpretation of the claims and the specification.

As used herein, the terms "comprises," "comprising," "includes," "including," "has," "having," "contains" or "containing," or any other variation thereof, are intended to cover a non-exclusive inclusion. For example, a method, article, or apparatus that comprises a list of elements is not necessarily limited to only those elements but can include other elements not expressly listed or inherent to such method, article, or apparatus.

Additionally, the term "exemplary" is used herein to mean "serving as an example, instance, or illustration." Any embodiment or design described herein as "exemplary" is not necessarily to be construed as preferred or advantageous over other embodiments or designs. The terms "one or more" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection".

References in the specification to "one embodiment," "an embodiment," "an example embodiment," or variants of such phrases indicate that the embodiment described can include a particular feature, structure, or characteristic, but every embodiment can include the particular feature, structure, or characteristic. Moreover, such phrases are not necessarily referring to the same embodiment. Further, when a particular feature, structure, or characteristic is described in connection knowledge of one skilled in the art to affect such feature, structure, or characteristic in connection with other embodiments whether or not explicitly described.

Furthermore, it should be appreciated that relative, directional or reference terms (e.g. such as "above," "below," "left," "right," "top," "bottom," "vertical," "horizontal," "front," "back," "rearward," "forward," etc.) and derivatives thereof are used only to promote clarity in the description of the figures. Such terms are not intended as, and should not be construed as, limiting. Such terms may simply be used to facilitate discussion of the drawings and may be used, where applicable, to promote clarity of description when dealing with relative relationships, particularly with respect to the illustrated embodiments. Such terms are not, however, intended to imply absolute relationships, positions, and/or orientations. For example, with respect to an object or structure, an "upper" surface can become a "lower" surface simply by turning the object over. Nevertheless, it is still the same surface and the object remains the same. Also, as used herein, "and/or" means "and" or "or", as well as "and" and "or." Moreover, all patent and non-patent literature cited herein is hereby incorporated by references in their entirety.

The terms "disposed over," "overlying," "atop," "on top," "positioned on" or "positioned atop" mean that a first element, such as a first structure, is present on a second element, such as a second structure, where intervening elements or structures (such as an interface structure) may or may not be present between the first element and the second element. The term "direct contact" means that a first element, such as a first structure, and a second element, such as a second structure, are connected without any intermediary elements or structures between the interface of the two elements.

Having described exemplary embodiments, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

Elements of different embodiments described herein may be combined to form other embodiments not specifically set forth above. Various elements, which are described in the context of a single embodiment, may also be provided separately or in any suitable sub-combination. Other embodiments not specifically described herein also may be within the scope of the following claims.

What is claimed is:

1. A vessel for containing a plasma undergoing thermonuclear fusion within a reaction volume, the vessel comprising:
    a rigid, inner structural member enclosing the reaction volume;
    a rigid, outer structural member enclosing, and rigidly coupled to, the inner structural member, wherein the rigid inner and outer structural members alone form a sealed, double-walled shell enclosing an interior volume that is separated from the reaction volume by the rigid, inner structural member; and
    a non-structural material fully captured in the separated, interior volume between the inner and outer structural members, the non-structural material being solid at room temperature and being molten during thermonuclear fusion of the plasma.

2. The vessel of claim 1, wherein the non-structural material comprises a metal.

3. The vessel of claim 2, wherein the metal comprises lead.

4. The vessel of claim 1, wherein the non-structural material is a neutron multiplier.

5. The vessel of claim 1, wherein the inner structural member is a semi-conductor.

6. The vessel of claim 1, wherein the inner structural member, or the outer structural member, or both members comprise atoms having atomic numbers that are lower than an atomic number of atoms comprising the non-structural material.

7. The vessel of claim 1, wherein the inner and outer structural members include a steel.

8. The vessel of claim 1, wherein the inner and outer structural members have a combined thickness that is less than a thickness of the non-structural material.

9. A structure for containing a plasma undergoing thermonuclear fusion within a reaction volume, the structure comprising:
a neutron shield comprising lithium; and
a vessel surrounded by the neutron shield, the vessel comprising:
a rigid, inner structural member enclosing the reaction volume;
a rigid, outer structural member enclosing, and rigidly coupled to, the inner structural member, wherein the rigid inner and outer structural members together form a sealed, double-walled shell enclosing an interior volume that is separated from the reaction volume by the rigid, inner structural member and that is separated from the neutron shield by the rigid, outer structural member; and
a non-structural material fully captured in the separated, interior volume between the inner and outer structural members, the non-structural material being solid at room temperature and being molten during thermonuclear fusion of the plasma.

10. The structure of claim 9, wherein the neutron shield comprises a salt and is solid at room temperature and molten during thermonuclear fusion of the plasma.

11. The structure of claim 9, wherein the non-structural material comprises a metal.

12. The structure of claim 11, wherein the metal comprises lead.

13. The structure of claim 9, wherein the non-structural material is a neutron multiplier.

14. The structure of claim 9, wherein the inner structural member comprises a semi-conductor.

15. The structure of claim 10, wherein the neutron shield comprises a fluoride salt, and wherein the outer structural member resists corrosion when placed into direct contact with the molten fluoride salt.

16. The structure of claim 15, wherein the non-structural material has a melting point that is lower than a melting point of the fluoride salt.

17. The structure of claim 9, wherein the inner structural member comprises steel.

18. The structure of claim 9, wherein the inner and outer structural members have a combined thickness that is less than a thickness of the non-structural material.

19. The structure of claim 9, wherein the non-structural material comprises lead and the neutron shield comprises FLiBe.

20. The structure of claim 9, wherein the inner structural member comprises silicon carbide.

* * * * *